(12) United States Patent
Mucibabic et al.

(10) Patent No.: US 8,641,399 B2
(45) Date of Patent: Feb. 4, 2014

(54) INJECTION MOLDING SYSTEM HAVING A DIGITAL DISPLACEMENT PUMP

(75) Inventors: Srdjan Mucibabic, Barrie (CA); Max Changchun Huang, Brampton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 13/513,968

(22) PCT Filed: Nov. 11, 2010

(86) PCT No.: PCT/CA2010/001755
§ 371 (c)(1),
(2), (4) Date: Jun. 5, 2012

(87) PCT Pub. No.: WO2011/075813
PCT Pub. Date: Jun. 30, 2011

(65) Prior Publication Data
US 2012/0251650 A1    Oct. 4, 2012

Related U.S. Application Data

(60) Provisional application No. 61/289,504, filed on Dec. 23, 2009.

(51) Int. Cl.
*B29C 45/82* (2006.01)

(52) U.S. Cl.
USPC .............................. 425/135; 425/166; 425/542

(58) Field of Classification Search
USPC ........................................ 425/135, 166, 542
See application file for complete search history.

(56) References Cited

U.S. PATENT DOCUMENTS

| | | | |
|---|---|---|---|
| 4,744,743 A | 5/1988 | Puschel et al. | |
| 5,052,909 A | 10/1991 | Hertzer et al. | |
| 5,093,052 A | 3/1992 | Wurl et al. | |
| 5,190,446 A | 3/1993 | Salter et al. | |
| 5,667,820 A * | 9/1997 | Heller et al. | ................. 425/135 |
| 6,116,138 A | 9/2000 | Achten | |
| 6,527,540 B1 | 3/2003 | Dantlgraber | |
| 6,557,344 B1 | 5/2003 | Puschel | |
| 6,854,268 B2 | 2/2005 | Fales et al. | |

(Continued)

FOREIGN PATENT DOCUMENTS

| | | |
|---|---|---|
| DE | 4143152 A1 | 7/1993 |
| DE | 102008060596 A1 | 9/2010 |
| GB | 1203366 A | 8/1970 |
| WO | 2008043169 A1 | 4/2008 |

OTHER PUBLICATIONS

PCT International Search Report, Branka Ristovski, 4 pages, Jan. 14, 2011.

*Primary Examiner* — Tim Heitbrink
(74) *Attorney, Agent, or Firm* — Husky Intellectual Property Services

(57) ABSTRACT

Injection molding system (20, 220, 320, 420) having hydraulic circuit (50, 250, 350, 450) for motivating hydraulic actuator (36, 38) comprising: pump motor (52); and digital displacement pump (54, 354A, 354B, 454A, 454B) having: piston assemblies (102A, 102B, 102C, 102D) actuatable by pump motor (52), piston assembly including: pair of inlet and outlets operable to be individually opened and closed at selective rate independently of actuation of each piston assembly; at least one hydraulic actuator (36, 38) operably coupled on each of rod side (64, 66) and cylinder side (58, 74) to first subset of the plurality of piston assemblies (102B, 102D) and second subset of the plurality of piston assemblies (102A, 102C), respectively.

19 Claims, 10 Drawing Sheets

(56) References Cited

U.S. PATENT DOCUMENTS

| | | |
|---|---|---|
| 6,912,849 B2 | 7/2005 | Inoue et al. |
| 7,325,537 B2 | 2/2008 | Mueller et al. |
| 2003/0188530 A1 | 10/2003 | Inoue et al. |
| 2004/0081717 A1 | 4/2004 | Marazita |
| 2004/0107699 A1 | 6/2004 | Fales et al. |
| 2006/0218913 A1 | 10/2006 | Ivantysynova et al. |
| 2008/0089964 A1 | 4/2008 | Kianpour et al. |
| 2008/0104955 A1 | 5/2008 | Khalil |
| 2011/0081643 A1* | 4/2011 | Fournier-Bidoz et al. ...... 425/10 |

* cited by examiner

INJECTION MOLDING SYSTEM HAVING A DIGITAL DISPLACEMENT PUMP

TECHNICAL FIELD

The present generally relates to injection molding systems. More specifically, the present invention relates to hydraulic circuits in an injection molding system.

BACKGROUND

Some examples of known injection molding systems are: (i) the HyPET™ Molding System, (ii) the Quadloc™ Molding System, (iii) the Hylectric™ Molding System, and (iv) the HyMet™ Molding System, all manufactured by Husky Injection Molding Systems, Ltd. of Bolton, Ontario, Canada. These injection molding systems include components that are known to persons skilled in the art and these known components will not be described here; these known components are described, by way of example, in the following references: (i) Injection Molding Handbook by Osswald/Tumg/Gramann ISBN: 3-446-21669-2; publisher: Hanser, and (ii) Injection Molding Handbook by Rosato and Rosato ISBN: 0-412-99381-3; publisher: Chapman & Hill. Injection molding systems typically include hydraulic actuators to move a movable platen and a reciprocating screw. Hydraulic power is typically provided by a pump or pumps, driven by one or more electric motors.

U.S. Pat. No. 6,854,268 to Fales et al. teaches a fluid control system may include a pump, a tank, and an actuator. A valve assembly may be configured to control fluid communication between the actuator, the tank, and the pump. An energy recovery circuit, including a pressure transformer, may be fluidly coupled to the actuator in parallel with the valve assembly.

U.S. Pat. No. 6,912,849 to Inoue et al teaches a cylinder driving system capable of reducing the number of hydraulic devices and the amount of energy loss and an energy regenerating method thereof. To this end, the system includes i) a hydraulic cylinder, ii) a hydraulic pump having three suction/discharge ports of a first port for supplying oil to a bottom chamber of the hydraulic cylinder or draining oil from the bottom chamber, a second port for draining oil from a head chamber of the hydraulic cylinder or supplying oil to the head chamber, and a third port for draining oil from a tank or supplying oil to the tank, the suction rate or the discharge rate in the first port being the sum of the respective discharge rates or suction rates in the second port and the third port, and iii) a driving source for driving the hydraulic pump.

SUMMARY

According to a first aspect, there is provided injection molding system (20, 220, 320, 420) having hydraulic circuit (50, 250, 350, 450) for motivating hydraulic actuator (36, 38) comprising: pump motor (52); and digital displacement pump (54, 354A, 354B, 454A, 454B) having: piston assemblies (102A, 102B, 102C, 102D) actuatable by pump motor (52), piston assembly including: pair of inlet and outlets operable to be individually opened and closed at selective rate independently of actuation of each piston assembly; at least one hydraulic actuator (36, 38) operably coupled on each of rod side (64, 66) and cylinder side (58, 74) to first subset of the plurality of piston assemblies (102B, 102D) and second subset of the plurality of piston assemblies (102A, 102C), respectively.

DETAILED DESCRIPTION OF THE DRAWINGS

Embodiments will now be described with reference to the accompanying drawings in which.

DETAILED DESCRIPTION OF THE EMBODIMENTS

Figure 1:
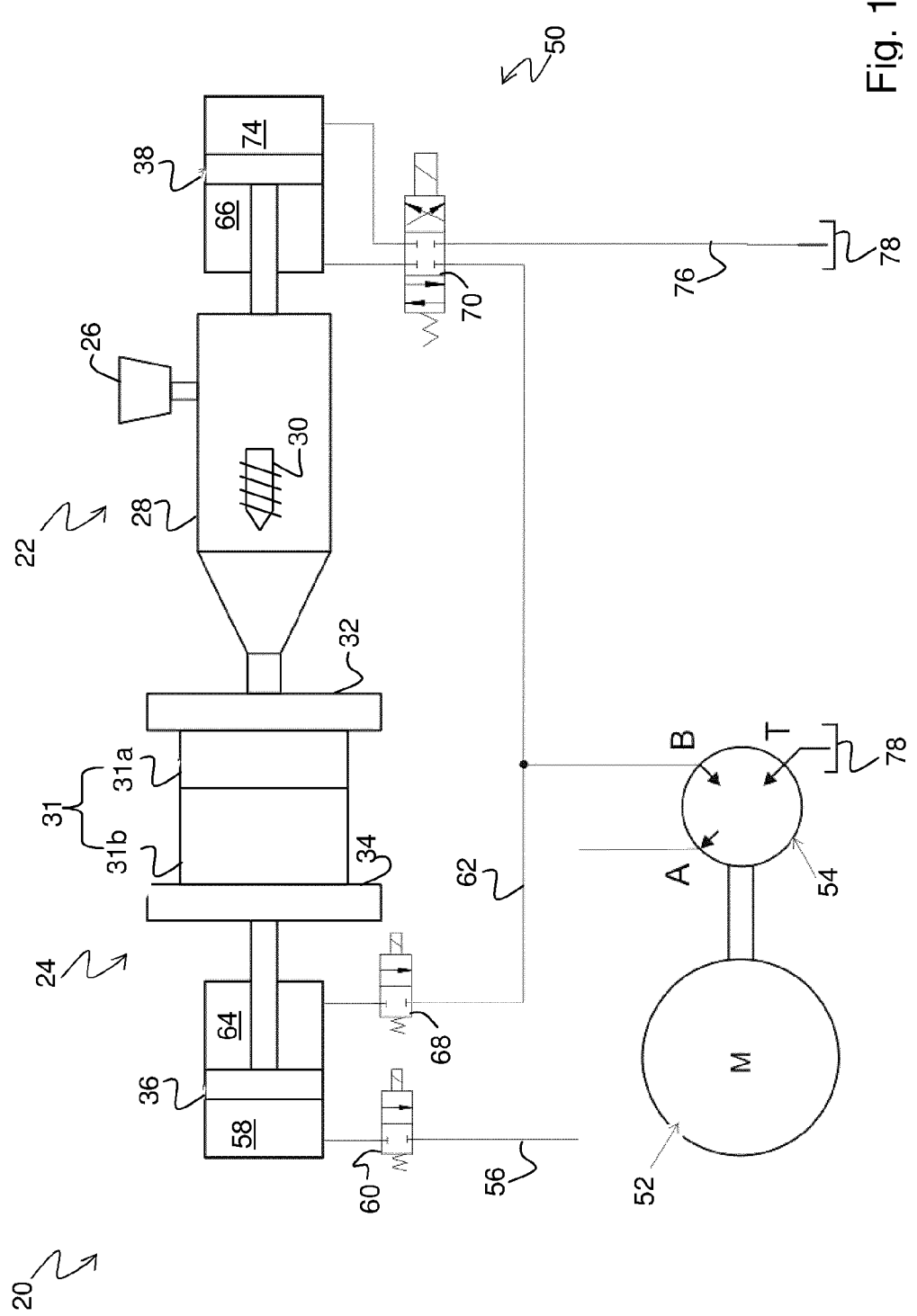
FIG. 1 is a schematic drawing of an injection molding system and a hydraulic circuit therefore.

Referring now to FIG. 1, an embodiment is shown generally at 20. Injection molding system 20 includes an extruder unit 22 and a clamping unit 24, each having at least one hydraulic actuator (36, 38) and operable to cooperate and produce a molded article.

The extruder unit 22 includes a hopper 26, attached to a barrel 28. A reciprocating screw 30 is disposed within the barrel 28. The hopper 26 is coupled to a feed throat of the extruder unit 22 so as to deliver pellets of moldable material to the extruder unit 22. The extruder unit 22 is configured to: (i) process the pellets into an injectable molding material, and (ii) inject the injectable material into the clamping unit 24. An HMI (not shown) is coupled to control equipment, and is used to assist an operator in monitoring and controlling operations of the injection molding system 20. In the presently-illustrated embodiment, reciprocating screw 30 is rotated by an electric motor (not shown), and translated by a hydraulic actuator, hereafter referred to as the "injection actuator 38". As shown, the injection actuator 38 comprises a hydraulic piston. Alternatively, the extruder unit 22 could be a two stage injection unit having a non-translating screw and a shooting pot plunger that is translated by the injection actuator 38.

The clamping unit 24 includes a stationary platen 32, and a movable platen 34. The stationary platen 32 is configured to support a stationary mold half 31a of a mold 31. The movable platen 34 is configured to: (i) support a moveable mold half 31b of the mold 31, and (ii) move relative to the stationary platen 32 so that the mold portions of the mold 31 may be separated from each other or closed together. Another hydraulic actuator, hereafter referred to as the "mold stroke actuator 36'', is used to stroke the movable platen 34 relative to the stationary platen 32. In the presently-illustrated embodiment, the mold stroke actuator 36 is a hydraulic piston. Optionally, during mold closure, the mold stroke actuator 36 decelerates shortly before achieving contact between the mold halves 31a and 31b to reduce the impact and preserve the lifespan of the mold 31.

Motive power for mold stroke actuator 36 and injection actuator 38 are provided by a hydraulic circuit 50. Hydraulic circuit 50 includes a pump motor 52. The implementation of pump motor 52 is not particularly limited and can include both AC and DC motors in both unidirectional and bidirectional configurations. In the current embodiment, pump motor 52 operates at constant speeds throughout the molding cycle (which is described in greater detail below). Pump motor 52 is operably coupled to drive at least one digital displacement pump (herein "digital displacement pump 54"). As shown, digital displacement pump 54 includes three ports: a first port (hereafter, "port A"), a second port (hereafter, "port B" and a third port (hereafter, "port T"). As is known to those of skill in the art, digital displacement pumps are generally defined as hydraulic piston pumps that have selectively-controlled valves, typically solenoid valves, on the output of each cylinder. Digital displacement pump 54 will be described in greater detail below.

Hydraulic circuit 50 further includes line 56 which couples the port A on digital displacement pump 54 to a cylinder side 58 on mold stroke actuator 36. Along line 56 between digital displacement pump 54 and mold stroke actuator 36 is a valve 60. In the currently-illustrated embodiment, valve 60 is a two port, two position valve that moves between an open position and a closed position to open or close communication on line 56 between digital displacement pump 54 and mold stroke actuator 36.

Hydraulic circuit 50 further includes line 62 which couples the port B on digital displacement pump 54 to both a rod side 64 on mold stroke actuator 36 and to either a rod side 66 or a cylinder side 74 on injection actuator 38. Along a first branch of line 62, between digital displacement pump 54 and mold stroke actuator 36, is a valve 68. In the currently-illustrated embodiment, valve 68 is a two port, two position valve that moves between an open position and a closed position to open or close communication on line 62 between digital displacement pump 54 and mold stroke actuator 36.

Along a second branch of line 62, between digital displacement pump 54 and injection actuator 38, is a valve 70. In the currently-illustrated embodiment, valve 70 is a four port, three position valve that moves between an open position, a closed position and a cross-over position to open or close communication on line 62 between digital displacement pump 54, the rod side 66 and the cylinder side 74 of injection actuator 38. Hydraulic circuit 50 further includes a line 76 which leads from valve 70 to a hydraulic tank 78 so that hydraulic fluid can be drained from either rod side 66 or cylinder side 74 to hydraulic tank 78 when the valve 70 is in the crossover or the open positions, respectively. For simplicity, pilot lines, gauges and the like have been omitted from the illustration of hydraulic circuit 50.

Figure 2:
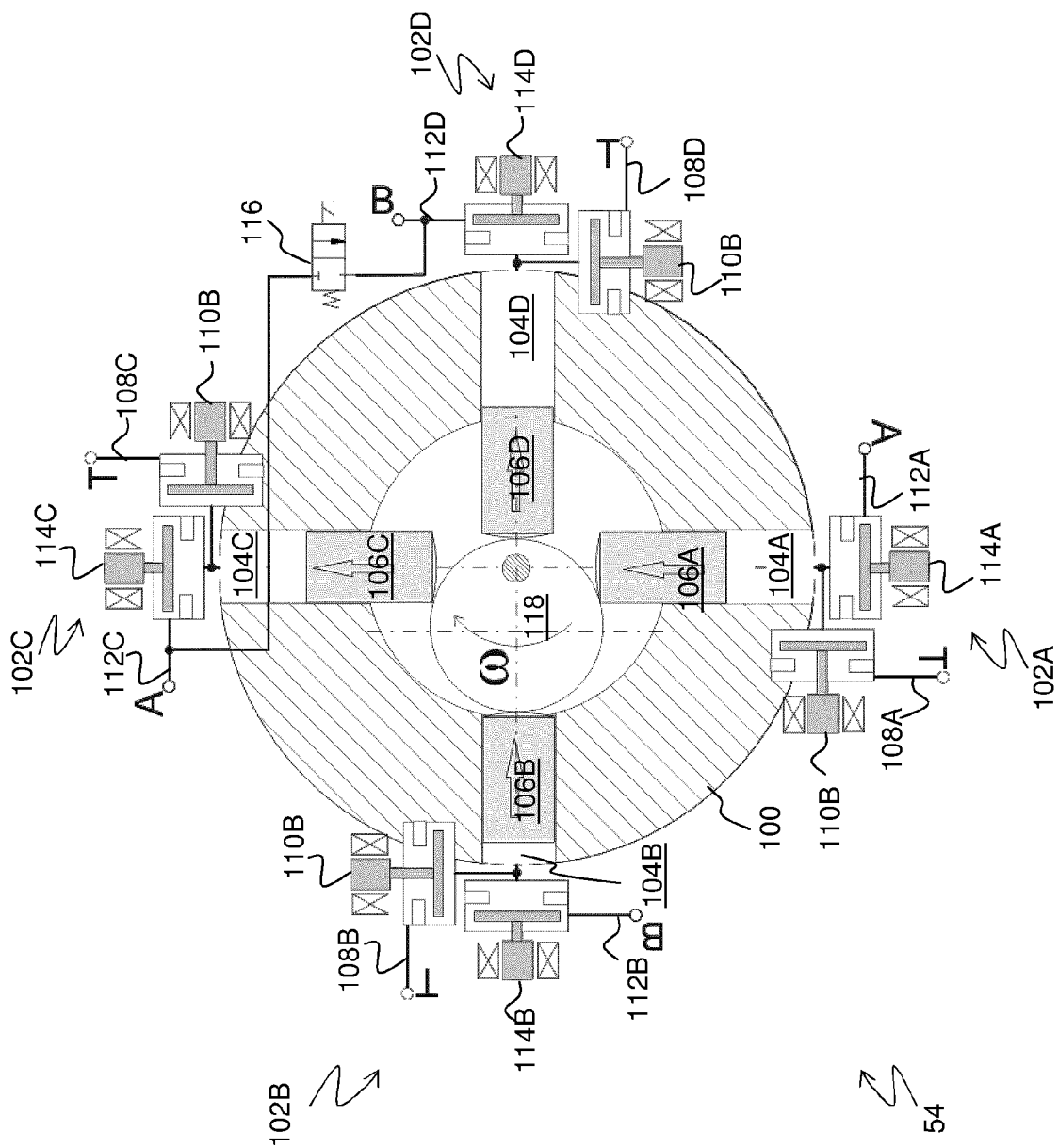
FIG. 2 is a cross-sectional view of a digital displacement pump for the injection molding system and hydraulic circuit of FIG. 1.

Referring now to FIG. 2, digital displacement pump 54, as it is configured for hydraulic circuit 50, is described in greater detail. Digital displacement pump 54 includes an annular body 100. Radially dispersed along annular body 100 are a plurality of piston assemblies 102. Four piston assemblies 102 are shown, namely a first piston assembly 102A, a second piston assembly 102B, a third piston assembly 102C and a fourth piston assembly 102D. Although the currently-illustrated embodiment shows radially-aligned piston assemblies 102, the use of axially-aligned piston assemblies is also contemplated. Each piston assembly 102 (102A, 102B, etc.) includes a chamber 104 (104A, 104B, etc.) and a piston 106 (106A, 106B, etc.) slidably located therewithin, so that translation of the piston 106 adjusts the volume of its respective chamber 104 (providing suction and discharge actions). Each piston assembly 102 further includes a pair of inlet and outlets for intaking and expelling of hydraulic fluid from the chamber 104. A first inlet and outlet 108 (108A, 108B, etc.) is provided, which is in selective communication with the hydraulic tank 78. A solenoid 110 (110A, 110B, etc.) opens and closes its respective first inlet and outlet 108 to provide selective communication between the respective chamber 104 and hydraulic tank 78. Each chamber 104 further includes a second inlet and outlet 112 (112A, 112B, etc.), which is in selective communication with either port A (leading to line 56 on hydraulic circuit 50) or port B (leading to line 62 on hydraulic circuit 50). A solenoid 114 (114A, 114B, etc.) opens and closes its respective second inlet and outlet 112. By selectively opening and closing solenoids 110 and 114 while pistons 106 are actuated, hydraulic fluid can be pumped out through either first inlet and outlet 108 or second inlet and outlet 112. Furthermore, as the duration of opening and closing solenoids 110 and 114 can be selectively varied, hydraulic fluid can be received or discharged from each chamber 104 at a selective rate (i.e., each piston assembly 102 can output a different volume of hydraulic fluid) while still maintaining a constant motor speed on pump motor 52. In addition, by adjusting the timing of opening and closing solenoids 110 and 114, the hydraulic fluid stored in each chamber 104 can be "preloaded" with pressure.

Digital displacement pump 54 includes a first subset of piston assemblies 102 leading to port A and a second subset of piston assemblies leading to port B. On first piston assembly 102A, second inlet and outlet 112A leads to port A, and on second piston assembly 102B, second inlet and outlet 112B leads to port B. On third piston assembly 102C, second inlet and outlet 112C branches and leads to both port A and a valve 116. In the presently-illustrated embodiment, valve 116 is a two port, two-way valve having an open and a closed position. On fourth piston assembly 102D, second inlet and outlet 112D also branches and leads to both port B and the other port of valve 116. Thus, when valve 116 is in an open position, the chambers 104C and 104D are in communication with each other. A similar connection, not shown, can be created between piston assemblies 102A and 102B.

Movement of each of the pistons 106 is effected by the rotation of an orbital cam 118, which is connected to the output shaft of pump motor 52, so that each piston 106 is translated sequentially. Hydraulic fluid within the chambers 104 provides lubrication.

During normal pumping operations, for each piston assembly 102 (102A, 102B, etc.), its respective first inlet and outlet 108 is opened and its respective second inlet and outlet 112 is closed during the retraction of the piston 106 from chamber 104, thereby filing the chamber 104 with hydraulic fluid. The respective second inlet and outlet 112 is opened and the respective first inlet and outlet 108 is closed during the insertion of the piston 106 into the chamber 104, thereby expelling the hydraulic fluid from chamber 104 out the second inlet and outlet 112. While in idle mode (that is to say, valves 60, 68 and 70 are in their closed positions so that digital displacement pump 54 is not providing hydraulic power to any of the hydraulic actuators attached to hydraulic circuit 50), the pump motor 52 continues to operate at a constant speed and the respective outlets 112 are selectively opened on the expelling and intaking the piston assemblies 102. Thus, when hydraulic fluid is being expelled from the chamber 104C, it is being routed into the chamber 104D, recovering some of the mechanical pumping energy. Alternatively, the hydraulic fluid can be returned to hydraulic tank 78. In this case, the respective second inlet and outlet 112 remains closed during the insertion of the piston 106 into the chamber 104 and the inlet 108 is opened so that the hydraulic fluid is returned to hydraulic tank 78. It will be appreciated that at least one digital displacement pump 54, 354A, 354B, 454A, 454B is operable to operate in an idle mode by pumping the hydraulic fluid directly from one subset of the plurality of piston assemblies 102A, 102B, 102C, 102D to the second subset of the plurality of piston assemblies 102A, 102C without returning the hydraulic fluid to a hydraulic tank 78.

Figure 3:
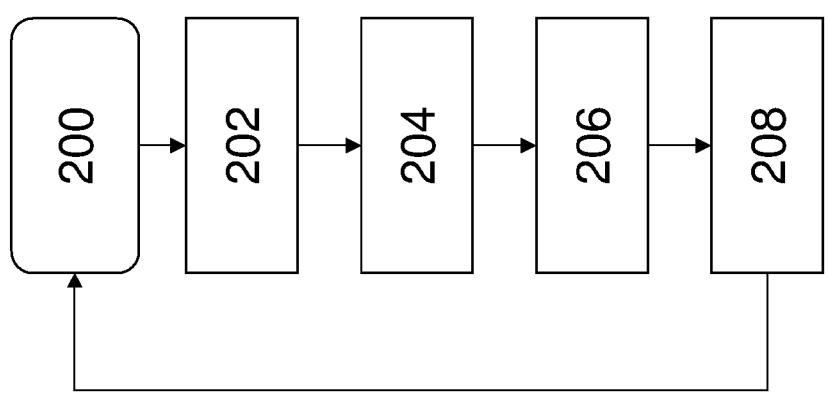
FIG. 3 is a flowchart of a method for operating the injection molding system and hydraulic circuit of FIG. 1 through an injection cycle.

Referring now to FIG. 3 (with continued reference to FIGS. 1 and 2), a method for controlling the flow of hydraulic fluid in hydraulic circuit 50 during a molding sequence is described, beginning at step 200. Throughout the method, pump motor 52 operates at a fixed speed. At step 200, mold closing is initiated. To perform a mold-closing operation (that is to say, to bring the mold halves 31a and 31b together) the valve 60 is in its open position. During the pumping cycle, solenoids 114A and 114C are opened during their discharge strokes so that flow from the digital displacement pump 54 is directed out through Port A to the cylinder side 58 of mold stroke actuator 36 in order to motivate the movable platen 34 to move towards the stationary platen 32. Valve 68 is also in its open position. During each suction stroke, solenoids 114B and 114D are opened to receive the hydraulic fluid returning along line 62 and received in digital displacement pump 54 through port B, recovering some of the mechanical pumping energy. If a regenerative circuit is desired to improve performance and minimize the amount of hydraulic fluid required, digital displacement pump 54 can direct the hydraulic fluid being received through port B back out through port A via valve 116 (selectively moved into the open position). Alternatively, the hydraulic fluid being received through port B can be returned to the hydraulic tank 78 for filtration, cooling or other fluid treatment. During the mold closing operation, valve 70 is in the closed position so that the injection actuator 38 does not move.

Once the mold-closing operation is complete, the method advances to step 202, where injection is initiated. Just before or after injection, the movable platen 34 is locked in place relative to the stationary platen 32 using rotating clamps, toggle clamps or the like (none shown). To begin valves 60 and 68 are both moved into the closed position. Valve 70 is moved into its crossover position so that port B on digital displacement pump 54 is in communication with cylinder side 74 on injection actuator 38 and rod side 66 of injection actuator 38 is in communication with hydraulic tank 78. Injection actuator 38 translates reciprocating screw 30 to inject the plastic resin into the mold 31. After the mold 31 has been substantially filled with resin, reciprocating screw 30 may continue to apply pressure. Valve 70 is moved into its closed position so that the injection actuator 38 is locked in its current position.

Once melt injection has been completed, the method advances to step 204, where recovery begins (i.e., reciprocating screw 30 retracts and begins to prepare new resin for the next injection cycle). To retract the reciprocating screw 30 during recovery, valve 70 moves into its open position so that cylinder side 74 of injection actuator 38 drains to hydraulic tank 78 and port B on digital displacement pump 54 supplies hydraulic fluid to rod side 66 of injection actuator 38. Once the reciprocating screw 30 is fully retracted, valve 70 moves back into its closed position.

The method advances to step 206 where the mold halves 31a, 31b are opened after the molded articles have cooled sufficiently. Valves 60 and 68 are both moved into their open positions and the flow from the digital displacement pump 54 is directed to the rod side 64 of mold stroke actuator 36 in order to motivate the movable platen 34 to move away from the stationary platen 32. During the pumping cycle of digital displacement pump 54, solenoids 114B and 114D are opened during their discharge strokes so that flow from the digital displacement pump 54 is directed out through port B on digital displacement pump 54 to the rod side 64 of mold stroke actuator 36. During each suction stroke, solenoids 114A and 114C are opened to receive the hydraulic fluid along line 56. Hydraulic fluid from the cylinder side 58 of mold stroke actuator 36 is thus directed back to the digital displacement pump 54, recovering some of the mechanical pumping energy. If a regenerative circuit is desired to improve performance and minimize the amount of hydraulic fluid required, digital displacement pump 54 can direct the hydraulic fluid being received through port A back out through port B as is described above by selectively opening valve(s) 116. Alternatively, the hydraulic fluid being received through port A can be returned to the hydraulic tank 78 for filtration, cooling or other fluid treatment. During the mold opening, valve 70 is in the closed position so that the injection actuator 38 does not move.

Once the movable platen 34 is fully retracted, the method advances to step 208, where digital displacement pump 54 operates in idle mode waiting for the molded articles to be removed from the mold 31. Once the molded articles have been removed, the injection molding system 20 is ready for another injection cycle and the method returns to step 200.

Although the method described generally in steps 200 to 208 has been shown to be sequential, those of skill in the art will recognize that some overlap of steps will occur for some applications. For example, the injection of melt into the mold 31 (step 200) can sometimes begin before the mold halves 31a, 31b halves have been fully closed (step 202). Alternatively, the recovery phase (step 204) can overlap the mold opening phase (step 206).

Figure 4:
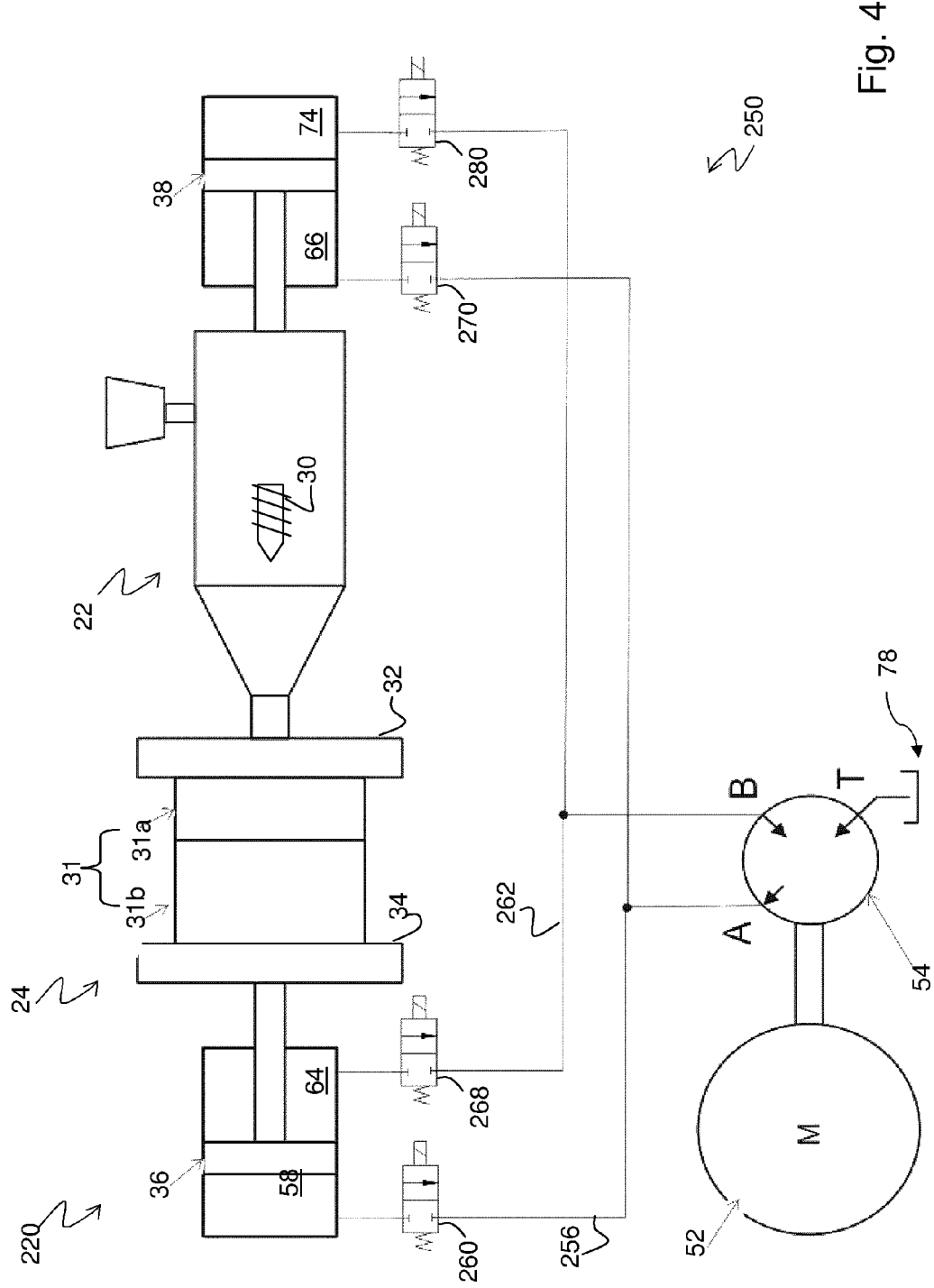
FIG. 4 is a schematic drawing of an injection molding system and hydraulic circuit in accordance with another embodiment.

Referring now to FIG. 4, an alternative embodiment of an injection molding machine is shown generally at 220. Injection molding system 220 includes similar components to the injection molding system 20, including an extruder unit 22 and a clamping unit 24. Extruder unit 22 still includes a reciprocating screw 30 that is translated by an injection actuator 38. Clamping unit 24 still includes a mold stroke actuator 36. However, the hydraulic circuit used to motivate the actuators, referred to generally as hydraulic circuit 250, is configured differently than the hydraulic circuit that was previously described. As with the previously-described embodiment, hydraulic power is provided by a digital displacement pump 54, which is operably driven by a pump motor 52.

In hydraulic circuit 250, port A on digital displacement pump 54 is connected to both the cylinder side 58 of mold stroke actuator 36 and the rod side 66 of injection actuator 38 by branches of a line 256. Along the branch of line 256 between port A of digital displacement pump 54 and mold stroke actuator 36 is a valve 260. In the currently-illustrated embodiment, valve 260 is a two port, two position valve that moves between an open position and a closed position to open or close communication on line 256 between digital displacement pump 54 and mold stroke actuator 36. A valve 270 is placed along line 256 between digital displacement pump 54 and injection actuator 38. In the currently-illustrated embodiment, the valve 270 is another two port, two position valve that moves between an open position and a closed position to open or close communication on line 256 between digital displacement pump 54 and injection actuator 38.

In hydraulic circuit 250, port B on digital displacement pump 54 is connected to both the rod side 64 of mold stroke actuator 36 and the cylinder side 74 of injection actuator 38 by a line 262. Along the branch of line 262 between digital displacement pump 54 and mold stroke actuator 36 is a valve 268. In the currently-illustrated embodiment, valve 268 is a two port, two position valve that moves between an open position and a closed position to open or close communication on line 262 between digital displacement pump 54 and mold stroke actuator 36. A valve 280 is placed along the branch of line 262 between digital displacement pump 54 and injection actuator 38. In the currently-illustrated embodiment, the valve 280 includes a two port, two position valve that moves between an open position and a closed position to open or close communication on line 262 between digital displacement pump 54 and injection actuator 38.

Port T on the digital displacement pump 54 is connected to the hydraulic tank 78, as is described generally above.

The method for operating the hydraulic circuit 250 is similar to what is generally described above with reference to FIG. 3, with the following exceptions. Since line 256 connects port A on digital displacement pump 54 to both the cylinder side 58 of mold stroke actuator 36 and the rod side 66 of injection actuator 38, and line 262 connects port B to both the rod side 64 of mold stroke actuator 36 and the cylinder side 74 of injection actuator 38, additional opportunities for regeneration of the hydraulic fluid are presented.

Figure 5:
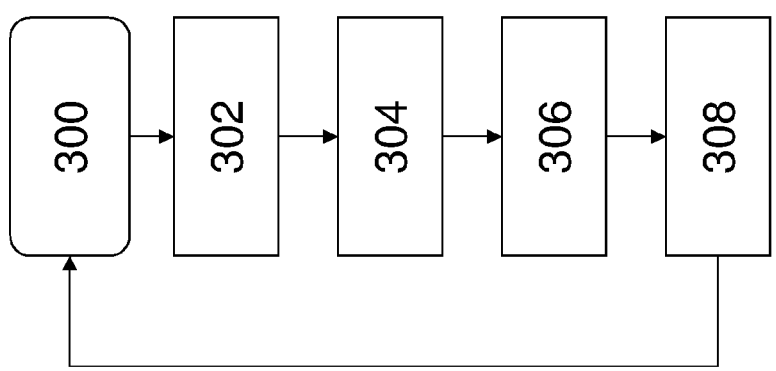
FIG. 5 is a flowchart of a method for operating the injection molding system and hydraulic circuit of FIG. 4 through an injection cycle.

Referring now to FIG. 5 (with reference back to FIGS. 4 and 2), a method for controlling the flow of hydraulic fluid in hydraulic circuit 250 during a molding sequence is described, beginning at step 300. At step 300, mold closing is initiated. To perform a mold-closing operation (that is to say, to bring the mold halves 31*a* and 31*b* together) the valve 260 is in its open position. During the pumping cycle, solenoids 114A and 114C are opened during their discharge strokes so that flow from port A of the digital displacement pump 54 is directed to the cylinder side 58 of mold stroke actuator 36 in order to motivate the movable platen 34 to move towards the stationary platen 32. Valve 268 is also in its open position. Hydraulic fluid from rod side 64 of mold stroke actuator 36 is directed back to the digital displacement pump 54 through port B. During each suction stroke, solenoids 114B and 114D are opened to receive the hydraulic fluid along line 262, recovering some of the mechanical pumping energy. If a regenerative circuit is desired to improve performance and minimize the amount of hydraulic fluid required, digital displacement pump 54 can direct the hydraulic fluid being received through port B back out through port A through valve 116 as is described above. Alternatively, the hydraulic fluid being received through port B can be returned to the hydraulic tank 78 via port T for filtration, cooling or other fluid treatment. During the mold close, the valves 270 and 280 are in the closed position so that the injection actuator 38 does not move.

Once the mold closing operation is complete, the method advances to step 302. The movable platen 34 is locked in place relative to the stationary platen 32 using rotating clamps, toggle clamps or the like (none shown). Injection of the melt into the mold halves 31*a*, 31*b* generally begins just after (or slightly before the platens are locked. Valves 260 and 268 are both moved into their closed positions. Valves 270 and 280 are moved into their open positions so that port B on digital displacement pump 54 is in communication with cylinder side 74 on injection actuator 38 and rod side 66 of injection actuator 38 is in communication with port A on digital displacement pump 54, recovering some of the mechanical pumping energy. If a regenerative circuit is desired to improve performance and minimize the amount of hydraulic fluid required, digital displacement pump 54 can direct the hydraulic fluid being received through port A back out through port B through valve 116 as is described above. Alternatively, the hydraulic fluid being received through port A can be returned to the hydraulic tank 78 via port T for filtration, cooling or other fluid treatment. Injection actuator 38 translates reciprocating screw 30 to inject the plastic resin into the mold halves 31*a*, 31*b*. After the mold halves 31*a*, 31*b* have been completely filled with resin, reciprocating screw 30 may continue to apply pressure. Valves 270 and 280 then moved into their closed positions so that the injection actuator 38 is locked in place.

Once melt injection has been completed, the method advances to step 404, where recovery begins (i.e., reciprocating screw 30 retracts and begins to prepare new resin for the next injection cycle). To retract the reciprocating screw 30 during recovery, valves 270 and 280 move into their open positions so that port A on digital displacement pump 54 supplies hydraulic fluid to rod side 66 of injection actuator 38. and cylinder side 74 of injection actuator 38 drains into port B of digital displacement pump 54, recovering some of the mechanical pumping energy. As with step 304, regeneration of hydraulic fluid between ports A and B is possible. Once the reciprocating screw 30 is fully retracted, valve 270 moves back into its closed position.

Once the molded articles formed within mold halves 31*a*, 31*b* have cooled sufficiently, the method advances to step 306 where the mold halves 31*a*, 31*b* are opened. Valves 260 and 268 are both moved into their open positions and the flow from the digital displacement pump 54 is directed to the rod side 64 of mold stroke actuator 36 in order to motivate the movable platen 34 to move away from the stationary platen 32. During the pumping cycle, solenoids 114B and 114D are opened during their discharge strokes so that flow from the digital displacement pump 54 is directed to the rod side 64 of mold stroke actuator 36. During each suction stroke, solenoids 114A and 114C are opened to receive the hydraulic fluid along line 256. Hydraulic fluid from the cylinder side 58 of mold stroke actuator 36 is thus directed back to the digital displacement pump 54, recovering some of the mechanical pumping energy. If a regenerative circuit is desired to improve performance and minimize the amount of hydraulic fluid required, digital displacement pump 54 can direct the hydraulic fluid being received through port A back out through port B as is described above. Alternatively, the hydraulic fluid being received through port A can be returned to the hydraulic tank 78 for filtration, cooling or other fluid treatment via port T. During the mold opening, valves 270 and 280 are in their closed positions so that the injection actuator 38 does not move.

Once the movable platen 34 is fully retracted, the method advances to step 308, where the molded articles are removed from the mold 31. Once the molded articles have been removed, the injection molding system 20 is ready for another injection cycle and the method returns to step 300.

Although the method described generally in steps 300 to 308 has been shown to be sequential, those of skill in the art will recognize that some overlap of steps will occur for some applications. For example, the injection of melt into the mold halves 31*a*, 31*b* (step 300) can sometimes begin before the mold halves 31*a*, 31*b* halves have been fully closed (step 302). Alternatively, the recovery phase (step 304) can overlap the mold opening phase (step 306).

Figure 6:
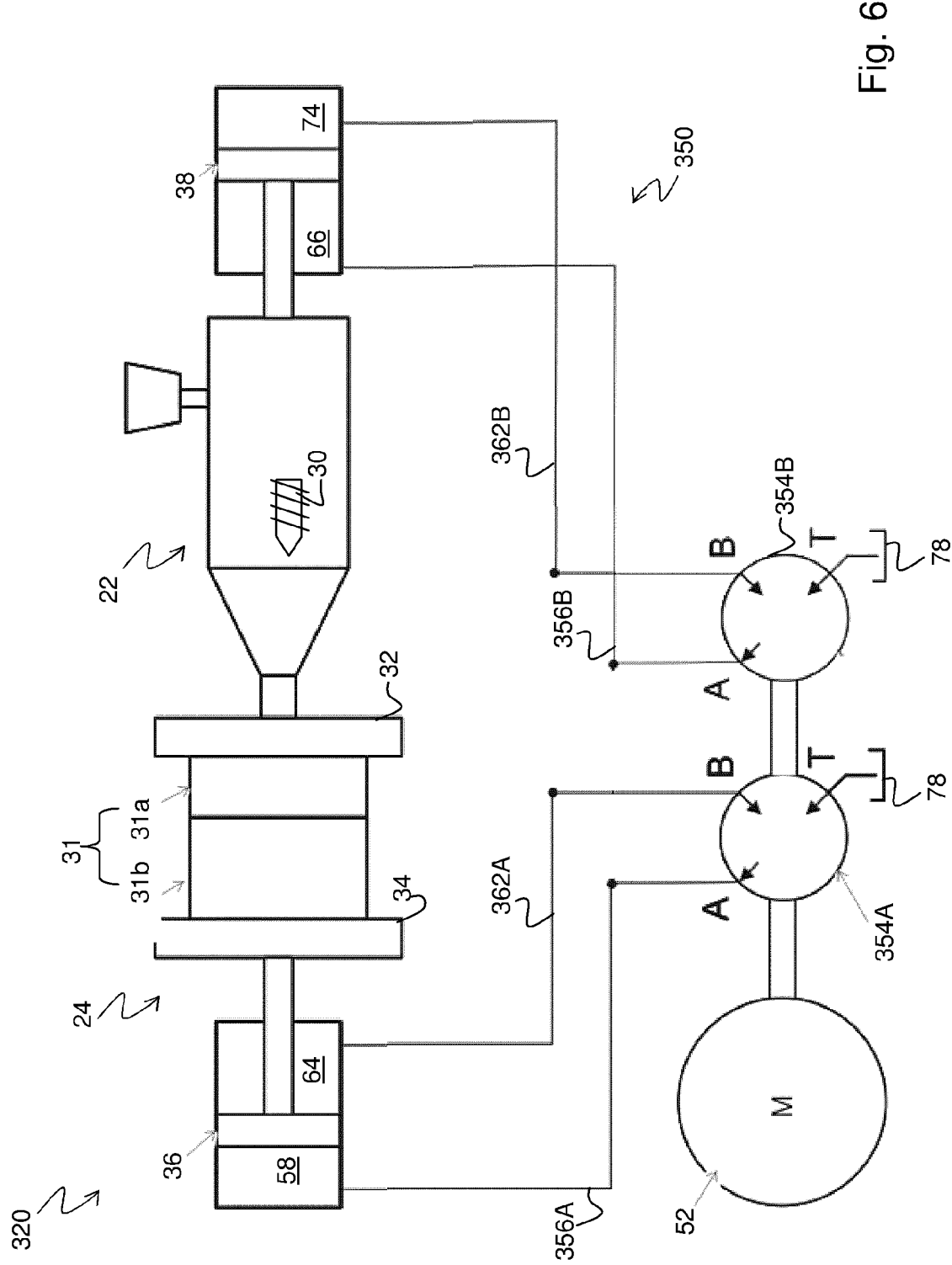
FIG. 6 is a schematic drawing of an injection molding system and hydraulic circuit in accordance with another embodiment.

Referring now to FIG. 6, an alternative embodiment of an injection molding machine is shown generally at 320. Injection molding system 320 includes similar components to the injection molding system 20, including an extruder unit 22 and a clamping unit 24. Extruder unit 22 still includes a reciprocating screw 30 that is translated by an injection actuator 38. Clamping unit 24 still includes a mold stroke actuator 36. However, the hydraulic circuit used to motivate the actuators, referred to generally as hydraulic circuit 350, is configured differently than the hydraulic circuit that was previously described. In the currently-illustrated embodiment, pump motor 52 is operably connected to drive multiple digital displacement pumps, and as shown, drives a first digital displacement pump 354A and a second digital displacement pump 354B. The first digital displacement pump 354A is operably connected to drive mold stroke actuator 36, and the second digital displacement pump 354B is operably connected to drive injection actuator 38.

Hydraulic circuit 350 further includes line 356A which couples the port A on first digital displacement pump 354A to the cylinder side 58 on mold stroke actuator 36. Hydraulic circuit 350 further includes line 362A which couples the port B on first digital displacement pump 354A to rod side 64 on mold stroke actuator 36. No valve is located along either line 356A or line 362A between the first digital displacement pump 354A and the mold stroke actuator 36. Instead, the plurality of piston assemblies on the first digital displacement pump 354A (described above with reference to digital displacement pump 54) act as valves to selectively open or close fluid communication along line 356A and 362B.

Hydraulic circuit 350 also includes line 356A which couples the port A on second digital displacement pump 354B to the rod side 66 on injection actuator 38. Hydraulic circuit 350 further includes line 362B which couples the port B on second digital displacement pump 354B to the cylinder side 74 on injection actuator 38. No valve is located along either line 356B or line 362B between the second digital displacement pump 354B and the injection actuator 38. Instead, the plurality of piston assemblies on the second digital displacement pump 354B (as described above) act as valves to selectively open or close fluid communication along line 356B and 362B.

Figure 7:
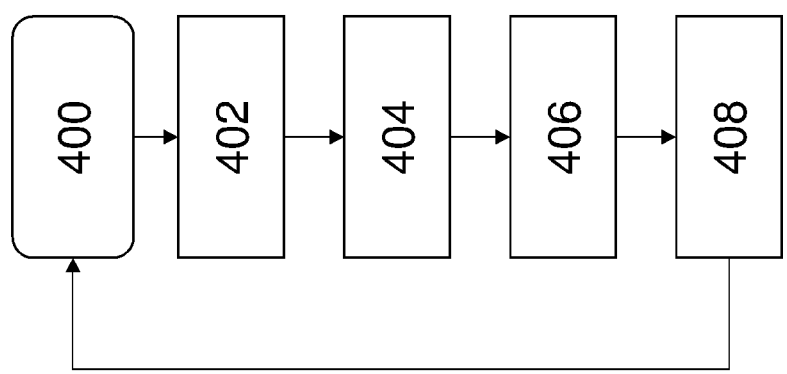
FIG. 7 is a flowchart of a method for operating the injection molding system and hydraulic circuit of FIG. 6 through an injection cycle.

The method for operating hydraulic circuit 350 is similar to what is generally described above with reference to FIG. 3, with the following exceptions. Referring now to FIG. 7 (with reference back to FIGS. 2 and 4), a method for controlling the flow of hydraulic fluid in hydraulic circuit 350 during a molding sequence is described, beginning at step 400.

At step 400, mold closing is initiated. To perform a mold-closing operation (that is to say, to bring the mold halves 31a and 31b together), first digital displacement pump 354A is engaged. During the pumping cycle, solenoids 114A and 114C are opened during their discharge strokes so that flow from port A of the first digital displacement pump 354A is directed to the cylinder side 58 of mold stroke actuator 36 in order to motivate the movable platen 34 to move towards the stationary platen 32. Hydraulic fluid from rod side 64 of mold stroke actuator 36 is directed back to the first digital displacement pump 354A through port B. During each suction stroke, solenoids 114B and 114D are opened to receive the hydraulic fluid along line 262A, recovering some of the mechanical pumping energy. If a regenerative circuit is desired to improve performance and minimize the amount of hydraulic fluid required, first digital displacement pump 354A can direct the hydraulic fluid being received through port B back out through port A through valve 116 as is described above. Alternatively, the hydraulic fluid being received through port B can be returned to the hydraulic tank 78 via port T for filtration, cooling or other fluid treatment. During the mold close, second digital displacement pump 354B is dormant so that the injection actuator 38 does not move.

Once the mold closing operation is complete, the method advances to step 402. The movable platen 34 is locked in place relative to the stationary platen 32 using rotating clamps, toggle clamps or the like (none shown). Injection of the melt into the mold halves 31a, 31b generally begins just after (or slightly before the platens are locked. First digital displacement pump 354A is disengaged. Second digital displacement pump 354B is engaged so fluid expressed out of port B on second digital displacement pump 354B is received by cylinder side 74 on injection actuator 38, and fluid expressed from the rod side 66 of injection actuator 38 is received through port A on second digital displacement pump 354B, recovering some of the mechanical pumping energy. If a regenerative circuit is desired to improve performance and minimize the amount of hydraulic fluid required, second digital displacement pump 354B can direct the hydraulic fluid being received through port A back out through port B through valve 116 as is described above. Alternatively, the hydraulic fluid being received through port A can be returned to the hydraulic tank 78 via port T for filtration, cooling or other fluid treatment. Injection actuator 38 translates reciprocating screw 30 to inject the plastic resin into the mold halves 31a, 31b. After the mold halves 31a, 31b have been completely filled with resin, reciprocating screw 30 may continue to apply pressure. Second digital displacement pump 354B is disengaged so that the injection actuator 38 is locked in place.

Once melt injection has been completed, the method advances to step 404, where recovery begins (i.e., reciprocating screw 30 retracts and begins to prepare new resin for the next injection cycle). To retract the reciprocating screw 30 during recovery, port A on second digital displacement pump 354B supplies hydraulic fluid to rod side 66 of injection actuator 38, and the cylinder side 74 of injection actuator 38 drains into port B of second digital displacement pump 354B, recovering some of the mechanical pumping energy. As with step 304, regeneration of hydraulic fluid between ports A and B is possible.

Once the molded articles formed within mold halves 31a, 31b have cooled sufficiently, the method advances to step 406 where the mold halves 31a, 31b are opened. First digital displacement pump 354A is engaged so that hydraulic fluid is directed to the rod side 64 of mold stroke actuator 36 in order to motivate the movable platen 34 to move away from the stationary platen 32. During the pumping cycle, solenoids 114B and 114D are opened during their discharge strokes so that flow from the first digital displacement pump 354A is directed to the rod side 64 of mold stroke actuator 36. During each suction stroke, solenoids 114A and 114C are opened to receive the hydraulic fluid along line 356A. Hydraulic fluid from the cylinder side 58 of mold stroke actuator 36 is thus directed back to the first digital displacement pump 354A. If a regenerative circuit is desired to improve performance and minimize the amount of hydraulic fluid required, first digital displacement pump 354A can direct the hydraulic fluid being received through port A back out through port B as is described above. Alternatively, the hydraulic fluid being received through port A can be returned to the hydraulic tank 78 for filtration, cooling or other fluid treatment via port T. During the mold opening, second digital displacement pump 354B is disengaged so that the injection actuator 38 does not move.

Once the movable platen 34 is fully retracted, the method advances to step 408, where the molded articles are removed from the mold 31. Once the molded articles have been removed, the injection molding system 20 is ready for another injection cycle and the method returns to step 400.

Although the method described generally in steps 400 to 408 has been shown to be sequential, those of skill in the art will recognize that some overlap of steps will occur for some applications, as is generally described above.

Figure 8:
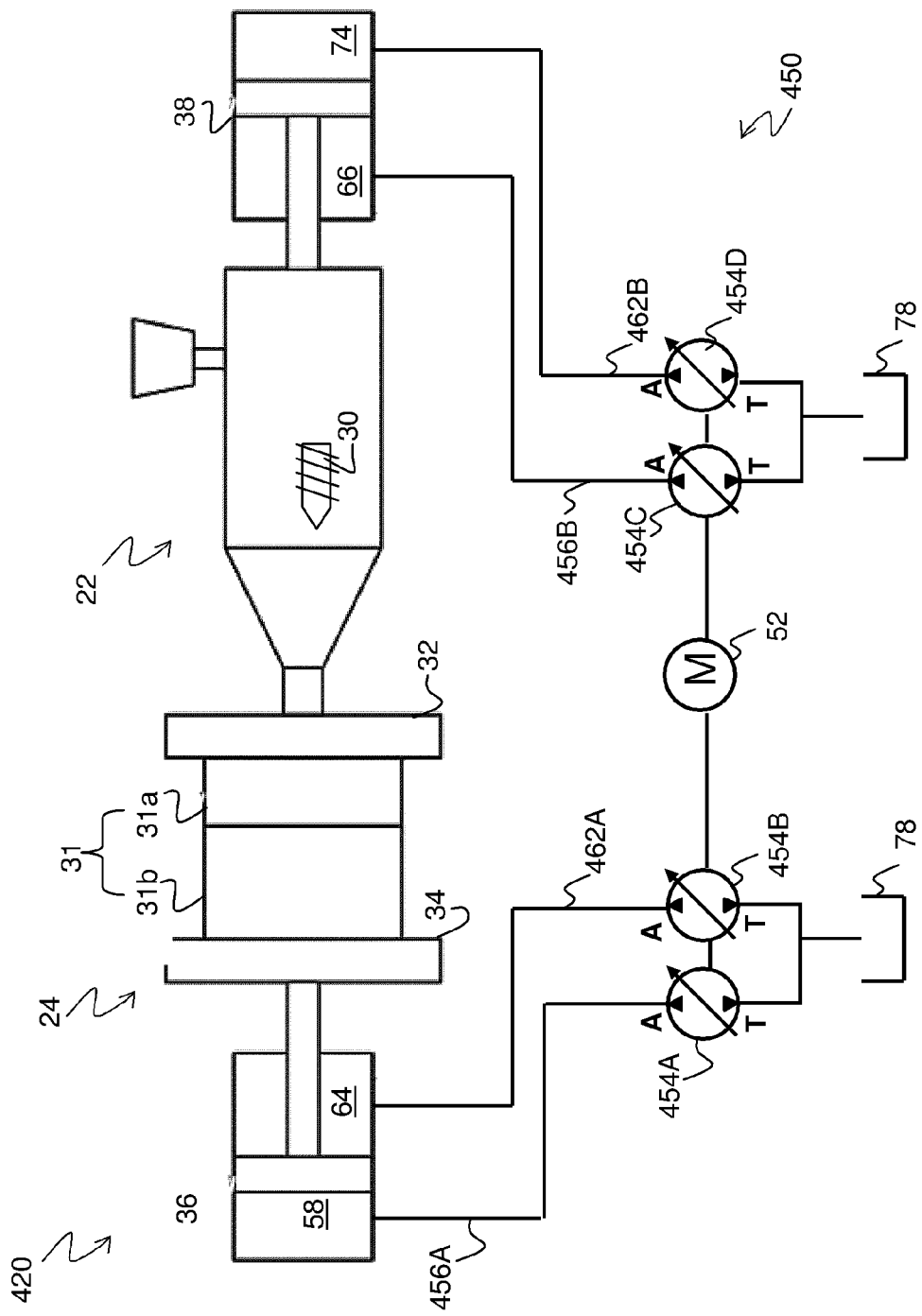
FIG. 8 is a schematic drawing of an injection molding system and hydraulic circuit in accordance with another embodiment.

Referring now to FIG. 8, an alternative embodiment of an injection molding machine is shown generally at 420. Injection molding system 420 includes similar components to the injection molding system 20, including an extruder unit 22 and a clamping unit 24. Extruder unit 22 still includes a reciprocating screw 30 that is translated by an injection actuator 38. Clamping unit 24 still includes a mold stroke actuator 36. However, the hydraulic circuit used to motivate the actuators, referred to generally as hydraulic circuit 450, is configured differently than the hydraulic circuit that was previously described.

Figure 10:
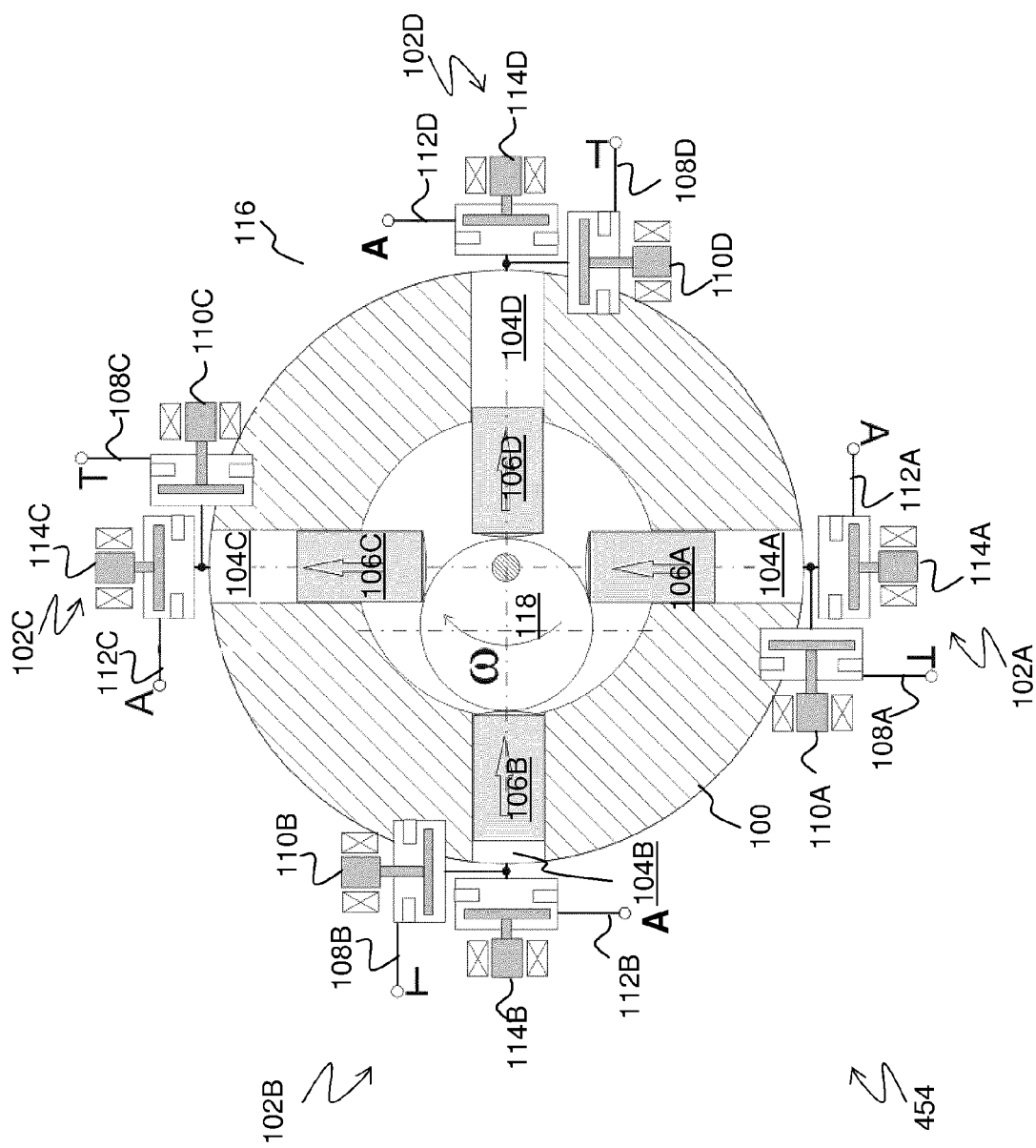
FIG. 10 is a cross-sectional view of a digital displacement pump for the injection molding system and hydraulic circuit of FIG. 8.

In the currently-illustrated embodiment, pump motor 52 is operably connected to drive multiple digital displacement pumps, and as shown, drives four digital displacement pumps, namely digital displacement pump 454A, 454B, 454C and 454D. Shown in greater detail in FIG. 10, each of digital displacement pumps 454A, 454B, 454C and 454D are two-port digital displacement pump, having two ports each, namely a port A and a port T rather than the three-port digital displacement pump 54 described above. Thus, each piston assembly 102 on each of digital displacement pumps 454A, 454B, 454C and 454D is providing pumping action along the same line 356A, 356B, 356C or 356D, respectively. In the presently-illustrated embodiment, each of the digital displacement pumps 454A to 454D lack the valve 116 of digital displacement pump 54 for selectively connecting different piston assemblies 102 together.

The digital displacement pump 454A is operably connected to drive the cylinder side 58 of mold stroke actuator 36. The digital displacement pump 454B is operably connected to drive the rod side 64 of mold stroke actuator 36. The digital displacement pump 454C is operably connected to drive the rod side 66 of injection actuator 38; and the digital displacement pump 454D is operably connected to drive the cylinder side 74 of injection actuator 38.

Hydraulic circuit 450 further includes line 456A which couples the port A on digital displacement pump 454A to the cylinder side 58 on mold stroke actuator 36. Hydraulic circuit 450 further includes line 462A which couples the port A on digital displacement pump 454B to rod side 64 on mold stroke actuator 36. No valve is located along either line 456A or line 462A between the digital displacement pump 454A and the mold stroke actuator 36. Instead, the plurality of piston assemblies 102 on the digital displacement pump 454A and 454B (described above with reference to digital displacement pump 54) act as valves to selectively open or close fluid communication along line 456A and 462B.

Hydraulic circuit 450 also includes line 456B which couples the port A on digital displacement pump 454C to the rod side 66 on injection actuator 38. Hydraulic circuit 450 further includes line 462B which couples the port A on digital displacement pump 454D to the cylinder side 74 on injection actuator 38. No valve is located along either line 456B or line 462B between the digital displacement pumps 454C and 454D and the injection actuator 38. Instead, the plurality of piston assemblies on the digital displacement pumps 454C and 454D act as valves to selectively open or close fluid communication along line 456B and 462B, as is described above.

Figure 9:
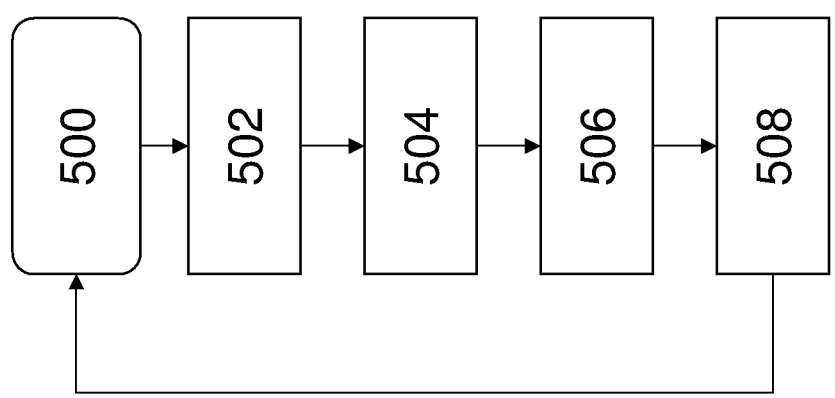
FIG. 9 is a flowchart of a method for operating the injection molding system and hydraulic circuit of FIG. 8 through an injection cycle.

The method for operating the hydraulic circuit 450 is similar to what is generally described above with reference to FIG. 3, with the following exceptions. Referring now to FIG. 9 (with reference back to FIGS. 8 and 10), a method for controlling the flow of hydraulic fluid in hydraulic circuit 450 during a molding sequence is described, beginning at step 500.

At step 500, mold closing is initiated. To perform a mold-closing operation (that is to say, to bring the mold halves 31a and 31b together), digital displacement pump 454A is engaged. Flow from port A of the digital displacement pump 454A is directed to the cylinder side 58 of mold stroke actuator 36 in order to motivate the movable platen 34 to move towards the stationary platen 32. Hydraulic fluid from rod side 64 of mold stroke actuator 36 is directed back to the digital displacement pump 454B through its port A, recovering a portion of the mechanical pumping energy. The hydraulic fluid being received in digital displacement pump 454B is returned to the hydraulic tank 78 via port T for filtration, cooling or other fluid treatment. During the mold close, digital displacement pumps 454C and 454D are dormant so that the injection actuator 38 does not move.

Once the mold closing operation is complete, the method advances to step 502. The movable platen 34 is locked in place relative to the stationary platen 32 using rotating clamps, toggle clamps or the like (none shown). Injection of the melt into the mold halves 31a, 31b generally begins just after (or slightly before) the platens are locked. Digital displacement pumps 454A and 454B are disengaged. Digital displacement pumps 454C and 454D are engaged so fluid expressed out of port A on digital displacement pump 454D is received by cylinder side 74 on injection actuator 38, and fluid expressed from the rod side 66 of injection actuator 38 is received through port A on digital displacement pump 454C, recovering a portion of the mechanical pumping energy. The hydraulic fluid being received through port A on digital displacement pump 454C can be returned to the hydraulic tank 78 via port T for filtration, cooling or other fluid treatment. Injection actuator 38 translates reciprocating screw 30 to inject the plastic resin into the mold halves 31a, 31b. After the mold halves 31a, 31b have been completed filled with resin, reciprocating screw 30 may continue to apply pressure. Digital displacement pumps 454C and 454D are disengaged so that the injection actuator 38 is locked in place.

Once melt injection has been completed, the method advances to step 504, where recovery begins (i.e., reciprocating screw 30 retracts and begins to prepare new resin for the next injection cycle). To retract the reciprocating screw 30 during recovery, port A on digital displacement pump 454C supplies hydraulic fluid to rod side 66 of injection actuator 38, and the cylinder side 74 of injection actuator 38 drains into port A of digital displacement pump 454D, recovering a portion of the mechanical pumping energy.

Once the molded articles formed within mold halves 31a, 31b have cooled sufficiently, the method advances to step 506 where the mold halves 31a, 31b are opened. Digital displacement pump 454B is engaged so that hydraulic fluid is directed to the rod side 64 of mold stroke actuator 36 in order to motivate the movable platen 34 to move away from the stationary platen 32. Flow from the digital displacement pump 454A is directed to the cylinder side 58 of mold stroke actuator 36. Hydraulic fluid from the cylinder side 58 of mold stroke actuator 36 is thus directed back to the digital displacement pump 454A, recovering a portion of the mechanical pumping energy. The hydraulic fluid being received through port A of digital displacement pump 454A is returned to the hydraulic tank 78 for filtration, cooling or other fluid treatment via port T. During the mold opening, digital displacement pumps 454C and 454D are disengaged so that the injection actuator 38 does not move.

Once the movable platen 34 is fully retracted, the method advances to step 508, where the molded articles are removed from the mold 31. Once the molded articles have been removed, the injection molding system 20 is ready for another injection cycle and the method returns to step 500.

Although the method described generally in steps 500 to 508 has been shown to be sequential, those of skill in the art will recognize that some overlap of steps will occur for some applications, as is generally described above.

While aspects of the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An injection molding system (20, 220, 320, 420) having a hydraulic circuit (50, 250, 350, 450) for motivating at least one hydraulic actuator (36, 38), the injection molding system (20, 220, 320, 420) comprising:
a pump motor (52); and
at least one digital displacement pump (54, 354A, 354B, 454A, 454B), the at least one digital displacement pump (54, 354A, 354B, 454A, 454B) having:
a plurality of piston assemblies (102A, 102B, 102C, 102D) being actuatable by the pump motor (52), each piston assembly of the plurality of piston assemblies (102A, 102B, 102C, 102D) including:
a pair of inlet and outlets (108A and 112A, 108B and 112B, 108C and 112C, 108D and 112D) that are operable to be individually opened and closed at a selective rate independently of actuation of the each piston assembly of the plurality of piston assemblies (102A, 102B, 102C, 102D);
the at least one hydraulic actuator (36, 38) being operably coupled on each of a rod side (64, 66) and a cylinder side (58, 74) to a first subset of the plurality of piston assemblies (102B, 102D) and a second subset of the plurality of piston assemblies (102A, 102C), respectively.

2. The injection molding system (20, 220, 320, 420) of claim 1, wherein:
the at least one digital displacement pump (54, 354A, 354B, 454A, 454B) is operable to actuate the at least one hydraulic actuator (36, 38) by expelling hydraulic fluid from one of the first subset of the plurality of piston assemblies (102B, 102D) and the second subset of the plurality of piston assemblies (102A, 102C) and intaking the hydraulic fluid through the other of the first subset of the plurality of piston assemblies (102B, 102D) and the second subset of the plurality of piston assemblies (102A, 102C).

3. The injection molding system (20, 220, 320, 420) of claim 1, wherein:
the at least one digital displacement pump (54, 354A, 354B, 454A, 454B) is further operable to regenerate a hydraulic fluid received from one of the first subset of the plurality of piston assemblies (102B, 102D) and the second subset of the plurality of piston assemblies (102A, 102C) through the other of the first subset of the plurality of piston assemblies (102B, 102D) and the second subset of the plurality of piston assemblies (102A, 102C).

4. The injection molding system (20, 220, 320) of claim 1, wherein:
the at least one digital displacement pump (54, 354A, 354B) includes:
a first port (B) operably coupling the first subset of the plurality of piston assemblies (102B, 102D) to the rod side (64, 66) of the at least one hydraulic actuator (36, 38);
a second port (A) operably coupling the second subset of the plurality of piston assemblies (102A, 102C) to the cylinder side (58) of the at least one hydraulic actuator (36, 38); and
a third port (T) operably coupling the plurality of piston assemblies (102A, 102B, 102C, 102D) to a hydraulic tank (78).

5. The injection molding system (420) of claim 1, wherein:
the at least one digital displacement pump (454A, 454B, 454C, 454D) includes four digital displacement pumps (454A, 454B, 454C and 454D), each of the four digital displacement pumps (454A, 454B, 454C, 454D) including:
a first port (A); and
a second port (T),
the first port (A) operably coupling one of the rod side (64, 66) or the cylinder side (58, 74) of the at least one hydraulic actuator (36, 38) to the plurality of piston assemblies (102A, 102B, 102C, 102D), and
the second port (T) operably coupling the plurality of piston assemblies (102A, 102B, 102C, 102D) to a hydraulic tank (78).

6. The injection molding system (320, 420) of claim 1, wherein:
the at least one digital displacement pump (354A, 354B, 454A, 454B) includes:
a first digital displacement pump (354A, 454A); and
a second digital displacement pump (354B, 454B),
the first subset of the plurality of piston assemblies (102B, 102D) is located on the first digital displacement pump (354A, 454A), and
the second subset of the plurality of piston assemblies (102A, 102C) is located on the second digital displacement pump (354B, 454B).

7. The injection molding system (20, 220, 320, 420) of claim 1, wherein:
the at least one hydraulic actuator (36, 38) includes:
an injection actuator (38).

8. The injection molding system (20, 220, 320, 420) of claim 1, wherein:
the at least one hydraulic actuator (36, 38) includes:
a mold stroke actuator (36).

9. The injection molding system (20, 220, 320, 420) of claim 1, wherein:
the at least one hydraulic actuator (36, 38) includes:
an injection actuator (38); and
a mold stroke actuator (36).

10. The injection molding system (20, 220, 320, 420) of claim 9, wherein:
the hydraulic circuit (50, 250, 350, 450) is operable to regenerate fluid from one of the mold stroke actuator (36) and the injection actuator (38) through the other of the mold stroke actuator (36) and the injection actuator (38) through the at least one digital displacement pump (54, 354A, 354B, 454A, 454B).

11. The injection molding system (20, 220, 320) of claim 1, wherein:
the at least one digital displacement pump (54, 354A, 354B) includes:
a first port (B) operably coupling the first subset of the plurality of piston assemblies (102B, 102D) to the rod side (64, 66) of the at least one hydraulic actuator (36, 38);
a second port (A) operably coupling the second subset of the plurality of piston assemblies (102A, 102C) to the cylinder side (58) of the at least one hydraulic actuator (36, 38); and
a third port (T) operably coupling the plurality of piston assemblies (102A, 102B, 102C, 102D) to a hydraulic tank (78),
the at least one digital displacement pump (54, 354A, 354B) is operable to provide selective communication between the first subset of the plurality of piston assemblies (102B, 102D) and the second subset of the plurality of piston assemblies (102A, 102C).

12. The injection molding system (220) of claim 1, further comprising:
a two port, two position valve (280) located between a first port (B) of the at least one digital displacement pump (54) and the cylinder side (74) of an another hydraulic actuator; and
another two port, two position valve (270) located between a second port (A) of the at least one digital displacement pump (54) and the rod side (66) of the another hydraulic actuator.

13. The injection molding system (20) of claim 1, further comprising:
a three position valve (70) located between a first port (B) of the at least one digital displacement pump (54) and each of the cylinder side (74) and the rod side (66) of another hydraulic actuator.

14. The injection molding system (20, 220, 320, 420) of claim 1, wherein:
the at least one digital displacement pump (54, 354A, 354B, 454A, 454B) is operable to operate in an idle mode by pumping a hydraulic fluid directly from one subset of the plurality of piston assemblies (102A, 102B, 102C, 102D) to the second subset of the plurality of piston assemblies (102A, 102C) without returning the hydraulic fluid to a hydraulic tank (78).

15. The injection molding system (20, 220, 320, 420) of claim 1, wherein:
the at least one digital displacement pump (54, 354A, 354B, 454A, 454B) is operable to preload pressure on a hydraulic fluid stored in each of the plurality of piston assemblies (102A, 102B, 102C, 102D) prior to expelling the hydraulic fluid.

16. The injection molding system (20, 220, 320) of claim 1, wherein:
each piston assembly (102B, 102D) of the first subset of the plurality of piston assemblies (102B, 102D) includes a first inlet and outlet (108A, 108B, 108C, 108D) in selective communication with a hydraulic tank (78) and a second inlet and outlet (112B, 112D) in selective communication with a first port (B) of the at least one digital displacement pump (54, 354A, 354B), and
each piston assembly (102A, 102C) of the second subset of the plurality of piston assemblies (102A, 102C) includes a first inlet and outlet (108A, 108B, 108C, 108D) in selective communication with the hydraulic tank (78) and a second inlet and outlet (112A, 112C) in selective communication with a second port (A) of the at least one digital displacement pump (54, 354A, 354B).

17. The injection molding system (20, 220, 320, 420) of claim 15, wherein:
the second inlet and outlet (112B, 112D) on the first subset of the plurality of piston assemblies (102B, 102D) is also in selective communication with the second inlet and outlet (112A, 112C) on the second subset of the plurality of piston assemblies (102A, 102C).

18. The injection molding system (320, 420) of claim 1, further comprising:
a second digital displacement pump (354B, 454B) coupled to another hydraulic actuator of the at least one hydraulic actuator (36, 38).

19. The injection molding system (320, 420) of claim 1, wherein a respective one of the pair of inlet and outlets (112A, 112B, 112C and 112D) provides the only valves for controlling communication of the hydraulic fluid between the at least one digital displacement pump (54, 354A, 354B, 454A, 454B) and the at least one hydraulic actuator (36, 38).

* * * * *